US012025289B2

(12) United States Patent
Danahy

(10) Patent No.: US 12,025,289 B2
(45) Date of Patent: Jul. 2, 2024

(54) CLEAN ROOM LIGHTING SYSTEM

(71) Applicant: Thomas M. Danahy, Osterville, MA (US)

(72) Inventor: Thomas M. Danahy, Osterville, MA (US)

( * ) Notice: Subject to any disclaimer, the term of this patent is extended or adjusted under 35 U.S.C. 154(b) by 0 days.

(21) Appl. No.: 18/511,273

(22) Filed: Nov. 16, 2023

(65) Prior Publication Data

US 2024/0167650 A1 May 23, 2024

Related U.S. Application Data

(60) Provisional application No. 63/384,129, filed on Nov. 17, 2022.

(51) Int. Cl.

| | |
|---|---|
| ***F21S 8/02*** | (2006.01) |
| ***F21V 15/01*** | (2006.01) |
| ***F21V 31/00*** | (2006.01) |
| *F21W 131/40* | (2006.01) |
| *F21Y 115/10* | (2016.01) |

(52) U.S. Cl.
CPC .............. *F21S 8/026* (2013.01); *F21V 15/01* (2013.01); *F21V 31/005* (2013.01); *F21W 2131/40* (2013.01); *F21Y 2115/10* (2016.08)

(58) Field of Classification Search
CPC ........ F21V 15/01; F21V 31/005; F21S 8/026; F21W 2131/40; F21Y 2115/10
See application file for complete search history.

(56) References Cited

U.S. PATENT DOCUMENTS

| | | | | |
|---|---|---|---|---|
| 5,934,786 | A | 10/1999 | O'Keefe | |
| 2014/0049956 | A1* | 2/2014 | Manahan | F21V 21/14 362/249.02 |
| 2016/0033110 | A1* | 2/2016 | Cai | A61L 9/00 427/553 |
| 2017/0082279 | A1* | 3/2017 | Manahan | F21V 25/12 |
| 2017/0356631 | A1 | 12/2017 | Satterfield et al. | |
| 2019/0170341 | A1* | 6/2019 | Lax | F21V 29/763 |
| 2021/0048169 | A1 | 2/2021 | Dahlen et al. | |

OTHER PUBLICATIONS

International Search Report and Written Opinion issued in PCT/US2023/80023 and mailed Mar. 21, 2024.

* cited by examiner

*Primary Examiner* — Kevin Quarterman
(74) *Attorney, Agent, or Firm* — Heslin Rothenberg Farley & Mesiti P.C.; Nicholas Mesiti

(57) ABSTRACT

A lighting system enables the lights within the ceiling of a clean room to be serviced and maintained without compromising the clean room and without disturbing the hermetic seals between the clean room and the ceiling grid. The lighting system includes a light transmissible lens hermetically sealed to one or more tracks of the ceiling grid system on the first upward side of a portion of the tracks so as to inhibit particles from passing between tracks and the lens. A light fixture may also be hermetically sealed to a first upward surface of the lens so as to inhibit particles from passing between the lens and the light fixture.

20 Claims, 10 Drawing Sheets

CLEAN ROOM LIGHTING SYSTEM

FIELD OF THE INVENTION

This application relates to clean rooms and clean room ceiling systems which include integrated light fixtures therein, and particularly to a light fixture and lighting system for use in clean room ceiling grids.

BACKGROUND

Clean rooms require sterile environments and are commonly used in facilities which require a sterile environment for research and/or manufacturing. Maintenance of clean rooms can be both costly and time consuming, generally requiring that internal surfaces be routinely disinfected, that and that air quality be controlled and monitored for factors such as humidity, temperature, pressure, and to prevent airborne contaminants from invading the sterile environment. To control the air quality in clean rooms, various hermetic seals are used for separating the clean room from a non-sterile environment. The hermetic seals help create a boundary separating the clean room from the outside environment. However, clean rooms require that their sterile environment be maintained while allowing for air to pass into the clean rooms. In addition, the sterility of the clean rooms must be maintained while allowing utilities, such as water, light, heat and electricity to be fed into the clean room.

A challenge with modern clean room maintenance procedures are the lack of methods and equipment which allow for the clean room to be maintained or serviced, without the need to compromise the sterile environment by breaking the hermetic seals of the clean room. Ceilings in clean rooms typically use a grid system with light fixtures mounted in the grids. The area below the grid system is part of the clean room, while the area above is isolated and hermetically sealed from the clean room. The ceiling grid systems typically support light fixtures which supply light into the clean room. And, these light fixtures require periodic maintenance including the replacement of light sources such as light bulbs and other electronic or mechanical components.

The maintenance of clean room lighting fixtures, for example, typically requires hermetic seals of the ceiling be maintained to replace parts of the fixtures including light bulbs. It is common to access the light fixture from the clean room, which results in a laborious and careful disassembly of the fixture to assure the hermetic seal between the ceiling grid and the clean room is not broken. The clean room industry would benefit from technologies and procedures which enable clean room maintenance, absent the need to jeopardize the sterile spaces by breaking the hermetic seals.

SUMMARY

The shortcomings of the prior art are overcome and additional advantages are provided through the provision of an easily serviced clean room lighting system. The system enables the lights within the ceiling of a clean room to be serviced and maintained without compromising the clean room and without disturbing the hermetic seals between the clean room and the ceiling grid. Unlike prior systems, which require the light fixture of a clean room to be laboriously disassembled to be serviced to preserve the hermetic seal, the light fixtures may be easily serviced and maintained from the area above the ceiling, which is isolated and hermetically sealed from the clean room. And, such service may be done without compromising the sterility of the clean room or any hermetic seals.

The clean room lighting system is useable in a ceiling grid system having a plurality of intersecting tracks for supporting panels. The ceiling grid system has an upward facing side and a downward facing side. The downward facing side forms a ceiling of a clean room and the upward facing side faces an above area isolated from the clean room, and the ceiling grid system hermetically seals the clean room from the above area. The lighting system includes a light transmissible lens hermetically sealed to one or more tracks of the ceiling grid system on the first upward side of a portion of the tracks so as to inhibit air and air borne particles from passing between tracks and the lens. The lens and tracks form a hermetic seal to hermetically isolate light fixture from the clean room. A light fixture is placed above or on the upper surface of the tracks and on the upper surface of the lens. The light fixture may in one aspect also be hermetically sealed to a first upward surface of the lens so as to inhibit air and airborne particles from passing between the lens and the light fixture. The light fixture includes a light assembly, the light assembly being removably coupled to the upward side of the light fixture to allow the light assembly to be removed from the light fixture by raising the light assembly from the light fixture. The light fixture and lens remain within the grid system when the light assembly is removed. Thus, the hermetic seals between the tracks and lens and track and light fixture remain intact when the light fixture is serviced or maintained. And, such service or maintenance can be performed from the area above the grid system without compromising the hermetic seals and the sterility of the clean room.

The light assembly includes one or more light sources, such as light bulbs or LED lights, and electronic fixtures to be coupled to the light sources. The light assembly may include LED lights and a driver. The light assembly, including the light sources, electronic fixtures and driver, may be removable from the light fixture in one piece as they are affixed to the light assembly. The light assembly, electronic fixtures and driver may also be separately removeable from the light fixture. Clamps clamp the light fixture to the lens and grid. A sealant located between the lens and the one or more tracks hermetically seals the lens to the one or more tracks. A sealant may also be used between the first upward surface of the lens and the light fixture to hermetically seal therebetween.

In another aspect, a clean room lighting system includes a light transmissible lens hermetically sealable to one or more intersecting tracks of a ceiling grid system on the first upward side of a portion of the tracks so as to inhibit air and air borne particles from passing between tracks and the lens; and a light fixture located on a first upward surface of the lens. The light fixture may also be hermetically sealed to the upper surface of the lens so as to inhibit air and air borne particles from passing between the lens and the light fixture. The light fixture includes a light assembly removably coupled to the upward side of the light fixture to allow the light assembly to be removed from the light fixture by raising the light assembly from the light fixture. At least one seal or sealant is useable for sealing the light transmittable lens to the first upward side of a portion of the one or more intersecting tracks and the light fixture to the first upward surface of the lens. Upon hermetically sealing the light transmissible lens to the first upward side of the tracks and the light fixture to the first upward surface of the lens, the downward facing side of the ceiling system forms a ceiling of a clean room and the upward facing side faces an above area isolated from the clean room. The ceiling grid system hermetically seals the clean room from the above area. The at least one seal or sealant may be an adhesive sealant. Additionally, if required, at least one seal or sealant may be a non-adhesive seal.

In another aspect, a method of facilitating a clean room lighting system is provided. The method includes hermetically sealing a light transmissible lens to one or more intersecting tracks of a ceiling grid system on the first upward side of a portion of the tracks so as to inhibit air and airborne particles from passing between tracks and the lens; fitting a light fixture on the first upward surface of the tracks and above the a first upward surface of the lens, wherein the light fixture comprises a light assembly. The light assembly is removably coupled to the upward side of the light fixture to allow the light assembly to be removed from the light fixture by raising the light assembly from the light fixture. Upon hermetically sealing the light transmissible lens to the first upward side of the tracks and placing the light fixture on the first upward surface of the lens, the downward facing side of the ceiling system forms a ceiling of a clean room and the upward facing side faces an above area isolated from the clean room, and the ceiling grid system hermetically seals the clean room from the above area. The method may also include hermetically sealing the light transmittable lens to the first upward side of a portion of the one or more intersecting tracks and the light fixture to the first upward surface of the lens. All other aspects of the system may be incorporated into the method.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

The system will now be described with reference to the drawings. As used herein the direction terms "upper", "above" or "top" refer to the direction facing the area above the clean room and ceiling grid, and the terms "lower", "below" or "bottom" refer to the direction facing the clean room.

Figure 1:
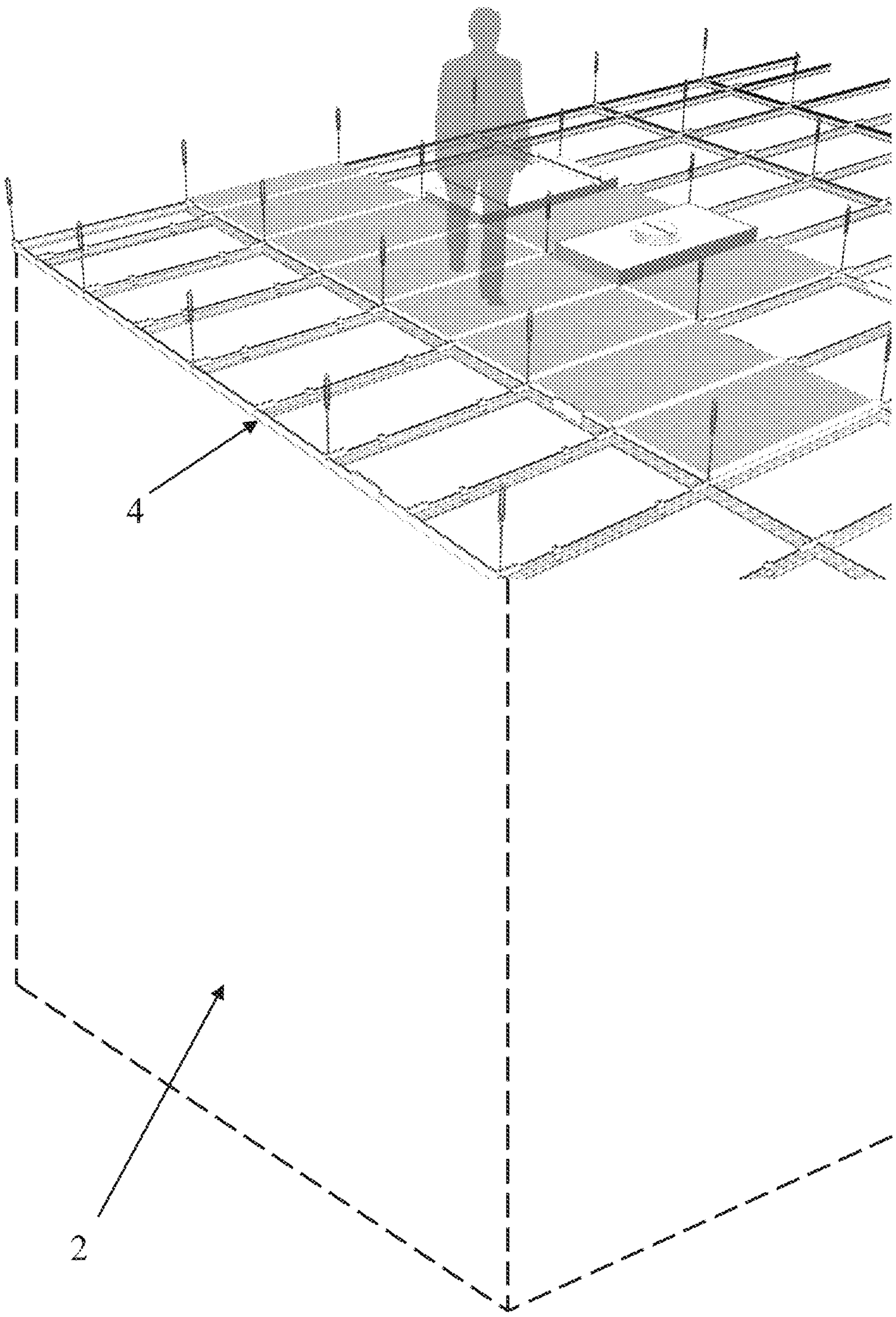
FIG. 1 depicts one example of schematic representation of a ceiling grid system of the type useable in accordance with an aspect of the present invention.

Referring to FIG. 1, a ceiling grid system 4 of the type usable in accordance with an aspect of the present invention is shown. A typical clean room 2 includes a ceiling formed by such a ceiling grid system. The ceiling grid system 4 is located above the clean room 2 and functions to hermetically seal the clean room from contaminants. The ceiling grid system 4 when fully assembled prevents air and air borne particles, such as dust and pathogens, from passing through the grid system 4 into the clean room 2. Accordingly, the grid system functions as a barrier at the ceiling of the clean room 2. Above the grid system 4 is an area which is hermetically isolated and sealed from the below clean room. The ceiling grid system 4 typically is structurally supported within the area above the clean room in such a manner so as to allow people to access the area above the clean room 2 including by walking on top of the grid system 4, as is shown in FIG. 1. The ceiling grid system 4, for example, may be suspended from structures above the grid system, such as trusses or joists. The ceiling grid system 4 is formed by a series of intersecting tracks 3. The tracks 3 are assembled to form the ceiling grid system 4 and are assembled such that rectangular openings are formed between tracks. These rectangular openings receive panels and other mechanical fixtures or devices, such as lights, vents etc. The panels and other fixtures placed within the grid openings form a closed ceiling. The ceiling essentially forms a hermetic seal at the top of the clean room. Panels placed within the openings are typically able to structurally support the weight of one or more persons. And, the tracks which form the grid system are structurally capable of supporting the panels and fixtures and devices, as well as the weight of people walking onto the panels in the grid system. Thus, the underside of the grid system functions as a ceiling, while the top side of the grid system functions essentially as a floor for the isolated area above the clean room.

Figure 2:
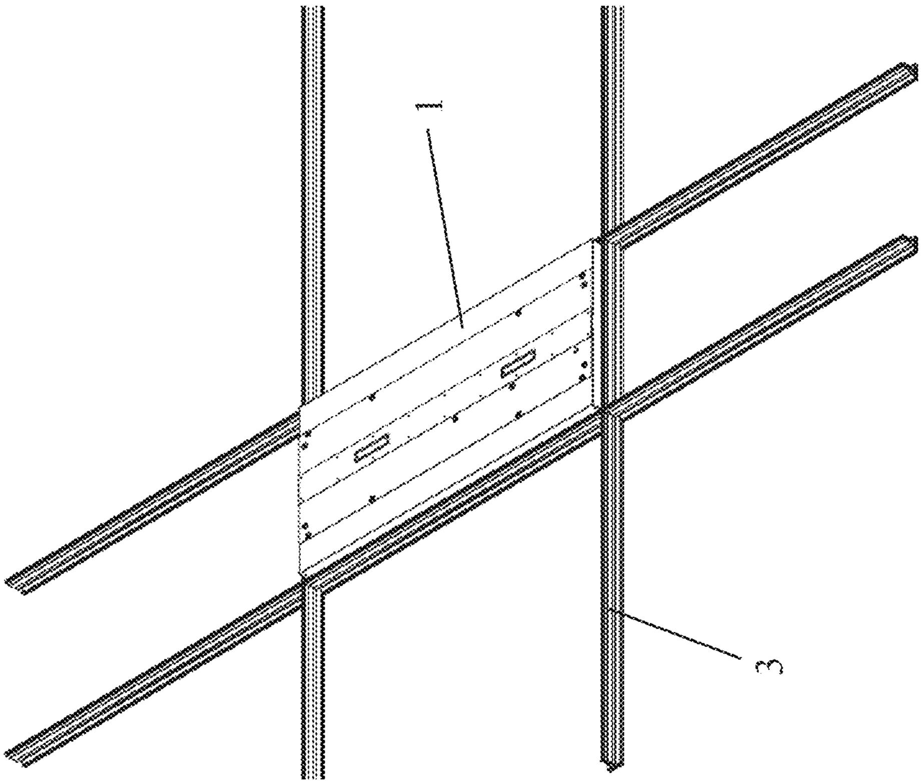
FIG. 2 depicts the components of a lighting system within a ceiling grid system of the type shown in FIG. 1.

Referring to FIG. 2, a section of a ceiling grid system 4 in accordance with an aspect of the invention is shown. The section includes one opening within a ceiling grid system formed by intersecting tracks 3. A lighting system 1, in accordance with aspects of the invention, is located between the intersecting tracks which form an opening in the grid system. Multiple lighting systems 1 may be used in multiple openings formed by the tracks which make up the grid system. However, for convenience, only one of the multiple lighting systems 1 within the grid is shown. Multiple lighting systems 1 are thus assembled into multiple openings of the ceiling grid system 4 to provide sufficient light into an entire clean room 2. The tracks 3 which form the grid system are typically formed of steel or aluminum; and are formed of a generally inverted “T” shaped cross section where a lower horizontal section is bisected by an upper vertical section at a 90 degree angle. The lower horizontal section includes an upper surface on each side of the vertical section. The upper surface of the horizontal section forms a lip on the track. The lip extends about the perimeter of each opening formed by the tracks of the grid. Each lighting system in accordance with an aspect of the present invention is placed and supported on the upper surface or lip of the tracks 3 forming a rectangular opening.

Figure 3A:
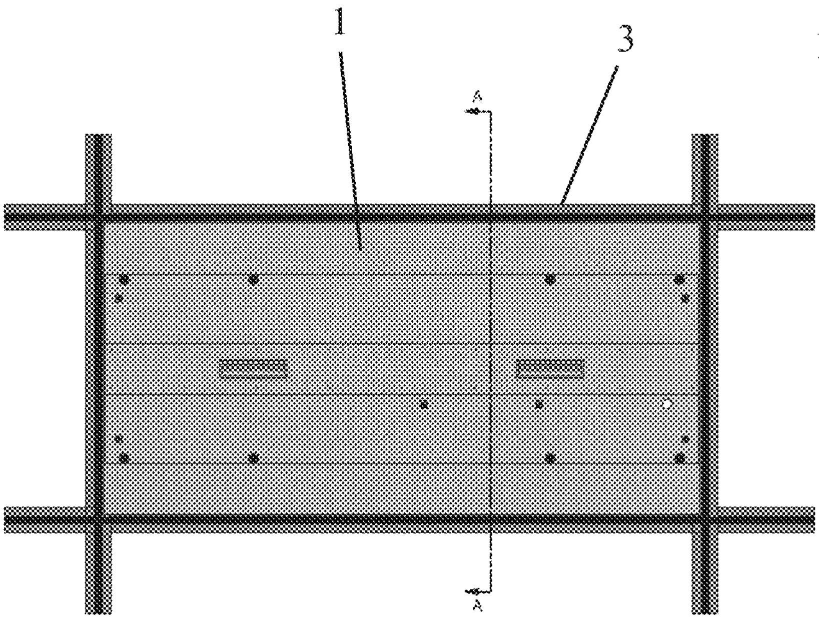
FIG. 3A depicts a top view of a light system within a ceiling grid system of the type shown in FIG. 1 in accordance with an aspect of the present invention.
Figure 3B:
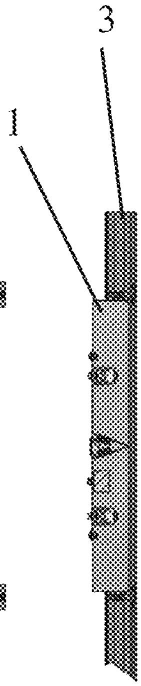
FIG. 3B depicts a sectional view of the light system of FIG. 3A taken along line A-A.

Referring to FIGS. 3A and 3B, a lighting system 1 is located within a rectangular opening formed in the ceiling grid and supported by the upper facing surface of the tracks 3. As shown in FIG. 3, the light system 1 extends fully between parallel sections of tracks 3, both at the long ends of the rectangular light system 1 as well as the short end ends. In this manner, the lighting system 1 fully occupies the entire open area formed between intersecting tracks 3 of the grid system 4.

Figure 4:
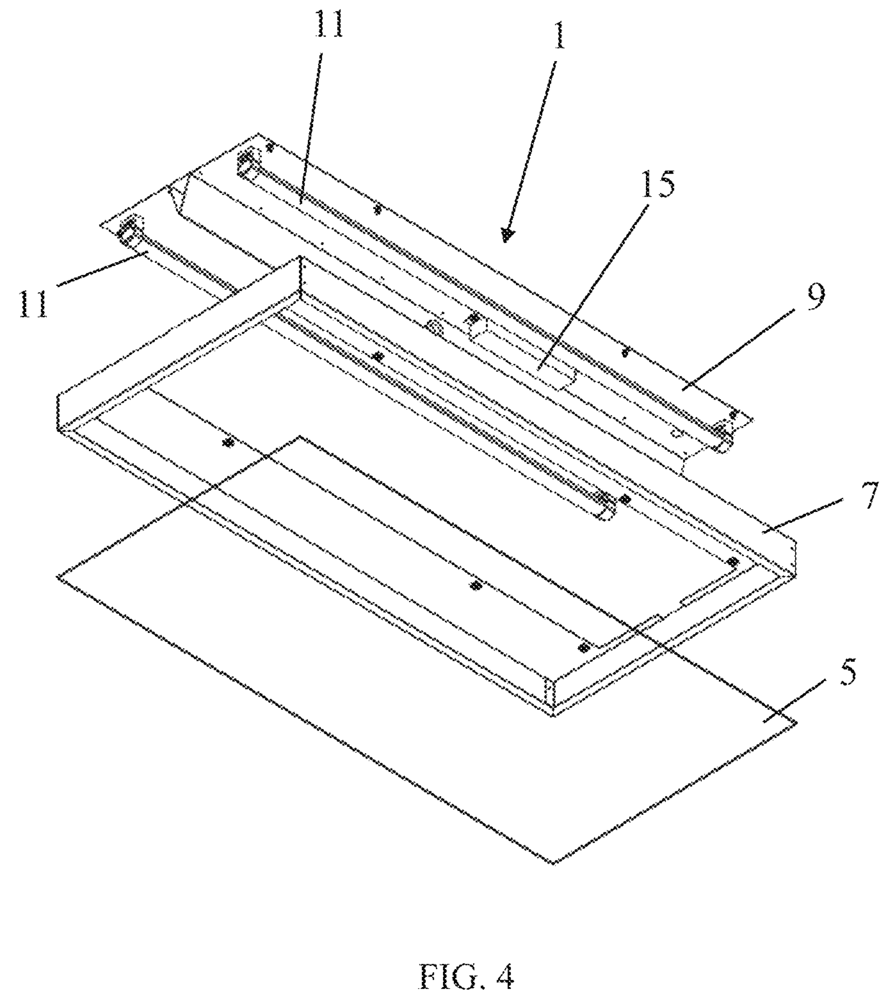
FIG. 4 depicts an exploded view of a light system of FIGS. 2-3B in accordance with an aspect of the present invention.

Referring now to FIG. 4, components of the lighting system 1 will now be described. The lighting system 1 includes a lens 5 which is light transmissible and preferably clear or opaque. The lens 5 is typically made of a plastic or polycarbonate material but may also be made of glass or any other light transparent or clear material. The lens 5 may be a simple clear material which does not significantly refract the light. Also, the lens 5 may be or include a diffuser for diffusing the light. For purposes herein, the lens 5 may function to allow light to pass therethrough while preventing particles from passing therethrough to maintain a hermetic seal. Located and stacked above the light transmissible lens 5 is a light fixture 7. The light fixture 7 is of a rectangular shape which fits within an opening of the grid system 4 formed between intersecting tracks 3, and matches the shape of the light transmissible lens 5. The light fixture essentially is shaped as a rectangular box with an open bottom, a top and sidewalls, where a cavity is formed therein and with the lens 5. Removably affixed to the top portion of the light fixture 7 is a light assembly 9. The light fixture 7 is oriented so that it is stacked above and in contact with the light transmissible lens 5. And, the light assembly 9 is stacked on top of the light fixture 7. The light assembly supports the lighting components such as light sources 11, a driver 15 and other electrical components. These lighting components are supported within the cavity of the light fixture above the lens.

Figure 5A:
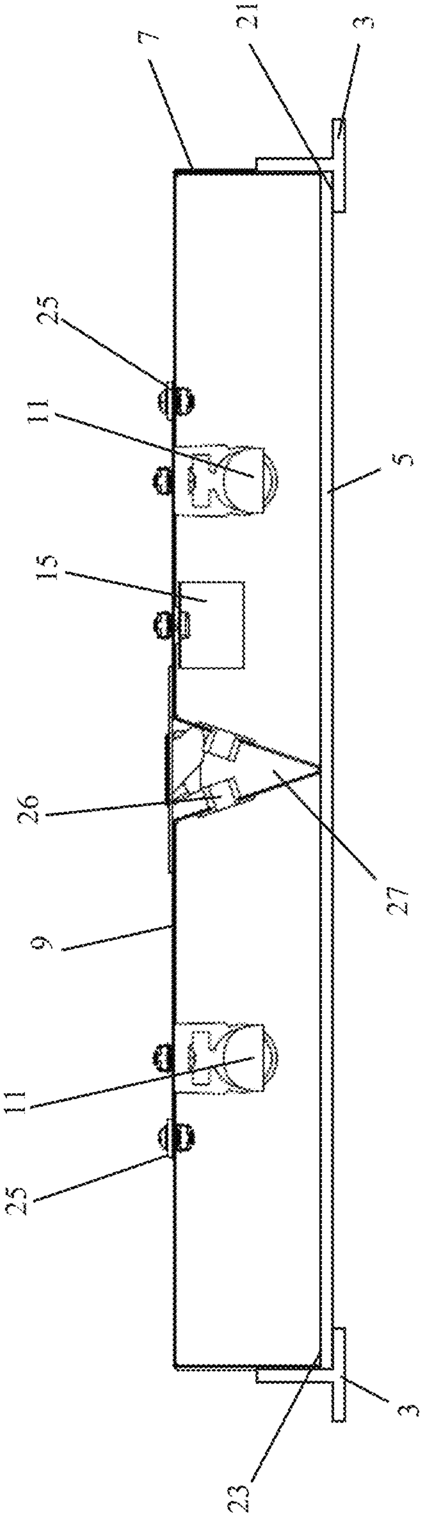
FIG. 5A depicts a cross sectional view of the light system of FIGS. 2-3B within a grid of a ceiling grid system of the type shown in FIG. 1 in accordance with an aspect of the present invention.
Figure 5B:
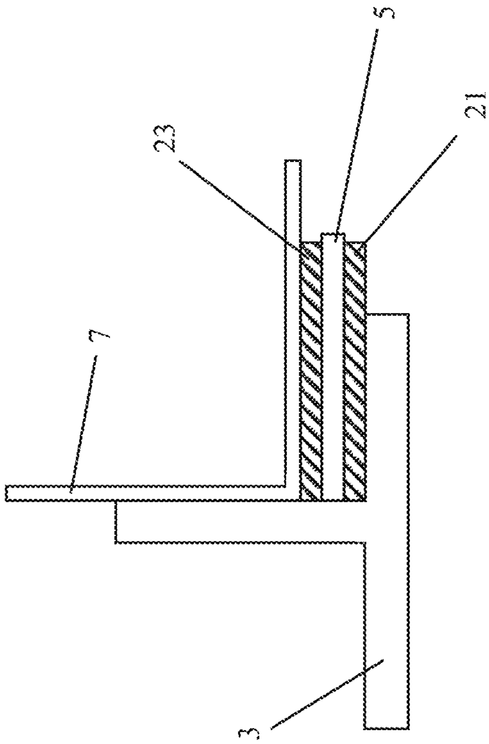
FIG. 5B depicts an exploded view of a light system of FIG. 5A including the position of the light fixture, lens and track, with the hermetic seals between the track and lens and between the lens and light fixture.
Figure 10:
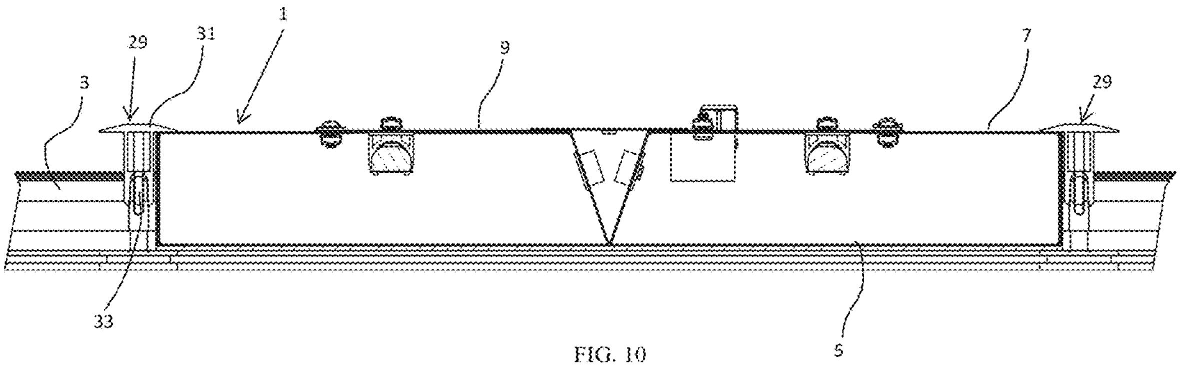
FIG. 10 depicts a sectional view of one embodiment of the light system where clamps are incorporated in the tracks and the clamps are used to maintain the fixture within the grid rectangle and compress the seals between the lens and tracks and lens and light fixture as required for efficacy.

In FIG. 5A a sectional view of an assembled light fixture 7 within the grid system 4 is shown. Also, in FIG. 5B a sectional view of a track 3 with a portion of an assembled lighting system 1 therein is shown. FIG. 10 shows a typical clamping fixture 29 used to clamp the fixture to the grid and compress the seal to specification. Referring now to FIGS. 5A and 5B, the light transmissible lens 5 is located between parallel tracks 3 of the grid system 4 and fits directly within a rectangular shape lip formed by the upper surfaces of the tracks 3 forming the grid system 4. The light transmissible lens 5 is sealed to the upper surface of the tracks 3 via a hermetic seal 21. The seal 21 may be obtained by using a sealant, such as an adhesive sealant, located between the lens 5 and the upper surface of the tracks 3. Also, the hermetic seal may be formed by using a non-adhesive seal or sealant between lens 5 and the upper surface of the tracks 3. This non adhesive seal may be obtained by using a non-adhesive material such as rubber or foam. Also, friction, the weight of the fixture, and/or clamps may be also used to obtain the hermetic seal 21. Above the lens 5 at its upper surface, the light fixture 7 is oriented. The light fixture 7 is placed directly above the lens 5 and also between the tracks 3 forming the grid system 4. An additional hermetic seal 23 may be located between the light fixture 7 and the upper surface of the light transmissible lens 5. This seal 23 may be obtained by use of a sealant located between the upper surface of the lens 5 and the bottom of the light fixture 7. An adhesive may be used as the sealant. Alternatively, the hermetic seal 23 may be formed by using a non-adhesive seal or sealant between the upper surface of the lens 5 and the lower surface of the light fixture 7. This non adhesive seal may also be obtained by using a non-adhesive material such as rubber or foam. Also, friction, the weight of the fixture and/or clamps 29 (FIG. 10) may also be used to obtain and maintain the hermetic seal 23. The hermetic seals 21, 23 need not necessarily be a separate structure from the lens 5, track 3 and/or light fixture 7. For example, the surface of the lens 5 which contacts the upper surface of the track 3 may be made of or incorporate a material which, when in contact with the upper surface of the track 3 and when supporting the weight of the light fixture 7 and/or is clamped, forms a hermetic seal. In addition, the upper surface of the lens 5 which contacts the lower surface of the light fixture 7 may be made of or incorporate a material which, when in contact with the upper surface of the lens 5 and when supporting the weight of the light fixture 7 and/or is clamped, forms a hermetic seal. However, in all situations and particularly when a non-adhesive seal is used, the weight of the light fixture 7 and the clamps should be sufficient to maintain appropriate force between the track 3 upper surface, lens 5 and light fixture 7 lower surface to compress and maintain the seal to prevent air and air borne particles from passing therebetween.

As shown in FIG. 5A, affixed to the top of the light fixture 7 is the light assembly 9. The light assembly 9 is affixed to the light fixture 7 by means of screws 25 or other types of fasteners. The light assembly 9 essentially includes a flat top surface and may be formed at least in part of a flat plate. The light assembly 9 is affixed to the remainder of the light fixture 7 and forms a closed top of the light fixture 7. On the underside of the flat top surface of the light assembly 9 at least a pair of light sources 11 may be affixed. As many as 2, 4 or 6 six light sources may be used. The light sources 11 may also be affixed by fasteners or other screws 25. Also affixed to the underside of light assembly 9 is a driver 15. The driver 15 regulates the power to, and controls, the light sources 11. As many as three drivers may be used. The driver 15 may also be affixed by screws or other fasteners 25 to the underside of the light assembly 9. On the underside of the light assembly there may be formed an access passage 27. The access passage 27 preferably runs the length of the light assembly and allows for wiring or other components to be placed therein. In addition, grommets 26 may be provided between the interior of the light fixture 7 to the passage 27 thereby providing access to the interior of the light fixture 7 from the passage 27. Wires may be passed through the grommets 26 from the passage 27 to the light sources 11.

Figure 6:
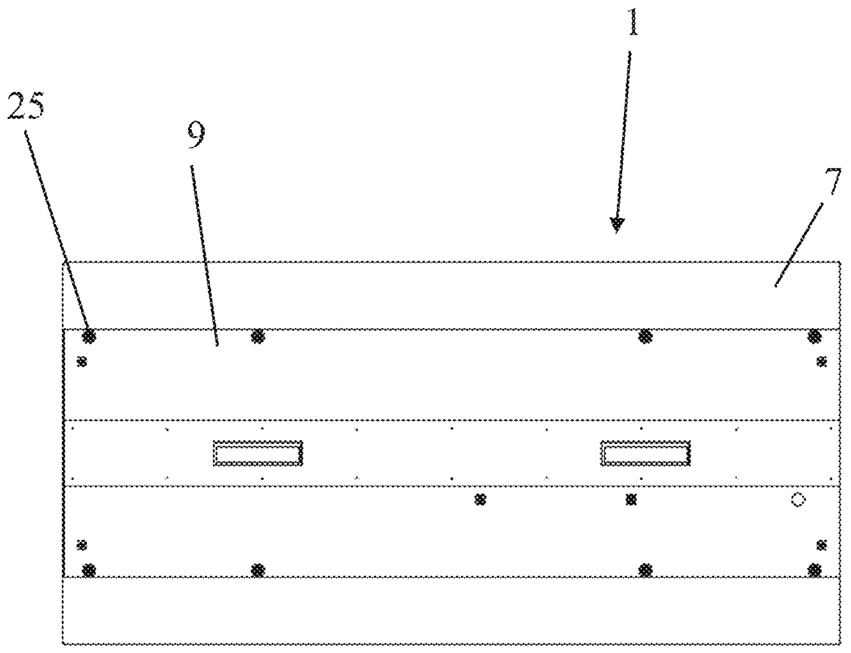
FIG. 6 depicts a top view of the light system of FIGS. 2-3B in accordance with an aspect of the present invention.

Referring now to FIG. 6 top view of the light fixture 7 and the lighting system 1 is shown. The top view is the view from the area above a clean room 2; the light fixture 7 and light assembly 9 are located on the top surface of the light system 1. A series of screws or other fasteners 25 are located on the perimeter of the light assembly 9 and screw into the top surface of the light fixture 7 to maintain the light assembly 9 in a fixed position with respect to the light fixture 7. If a smooth or completely flat surface of the topside of the light system 1 is desired, all or some of the fasteners connecting the light assembly 9 to the top of the light fixture 7 may be countersunk or dimpled into the top of the light assembly 9 and light fixture 7. And, some or all fasteners connecting the light sources 11 (as well as any fixtures to hold the light sources or any other components) to the light assembly 9 and light fixture 7, and the driver 15 to the light assembly, may be otherwise attached into the top of the light assembly 9 and light fixture 7.

Figure 7:
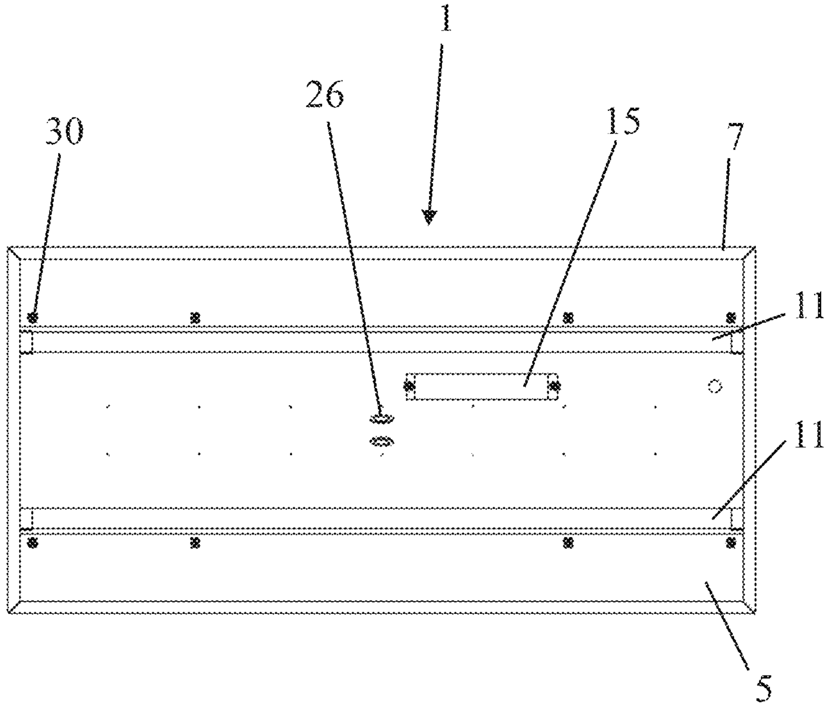
FIG. 7 depicts a bottom view of the light system of FIGS. 2-3B in accordance with an aspect of the present invention.

Referring to FIG. 7, a view from an underside of the light fixture 1 from within the clean room 2 is shown. Here, the light transmissible lens 5 is located on the underside side of the light fixture 7 facing the clean room 2. Behind the light transmissible lens 5, within the light fixture 7 are the light sources 11 and driver 15, as well as the grommets 26 for accessing the passage 27 (not shown). Finally, threaded bolt receivers or similar nut type devices 30 are located on the light fixture 7 to receive the screws or other fasteners 25 which hold the light assembly 9 onto the light fixture 7. When the lighting system 1 is to be maintained or serviced, the screws or fasteners 25 (FIG. 6) may be loosened to remove the light assembly 9 from the remainder of the light fixture 7. The light assembly 9 may be replaced in its entirety, or specific components such as the light sources 11 and/or driver 15 may be removed and replaced separately.

Figure 8:
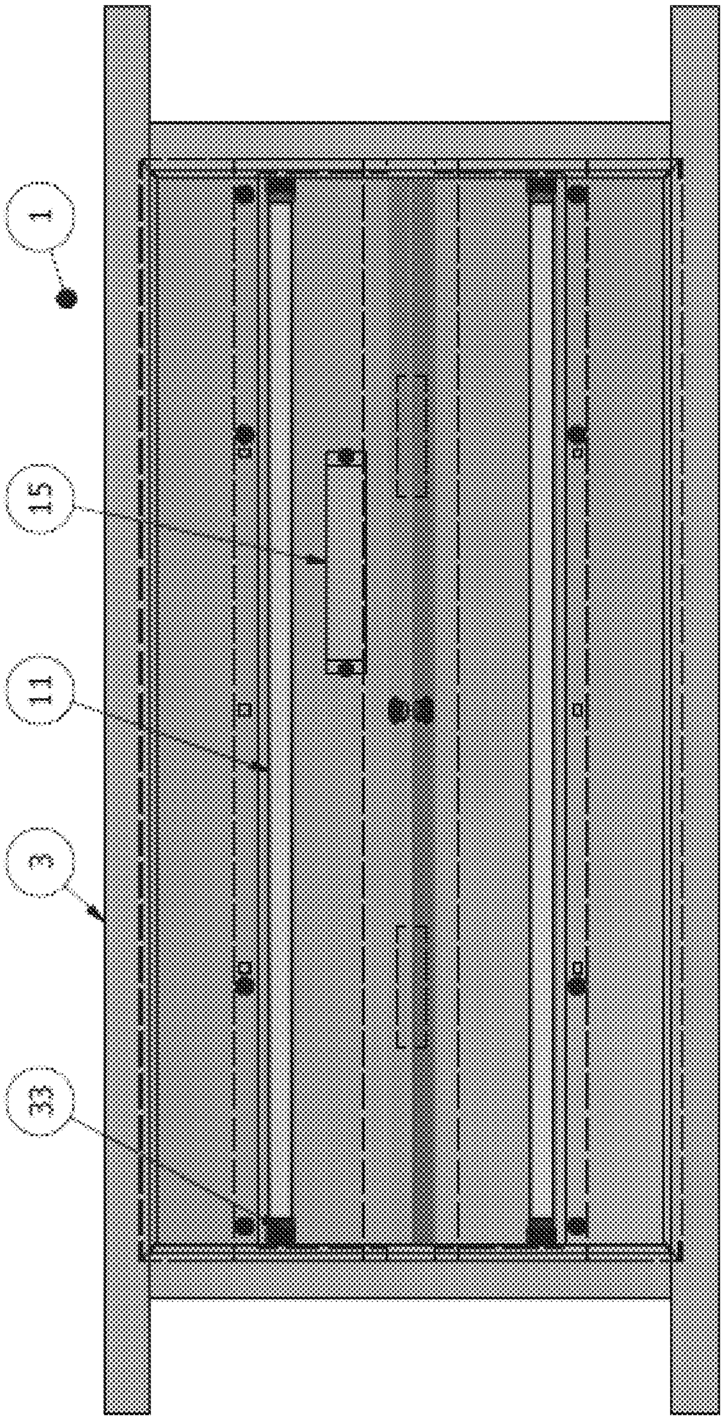
FIG. 8 depicts a perspective view from an end of a light system within tracks useable for a ceiling grid in accordance with an aspect of the present invention in accordance with an aspect of the present invention.
Figure 9:
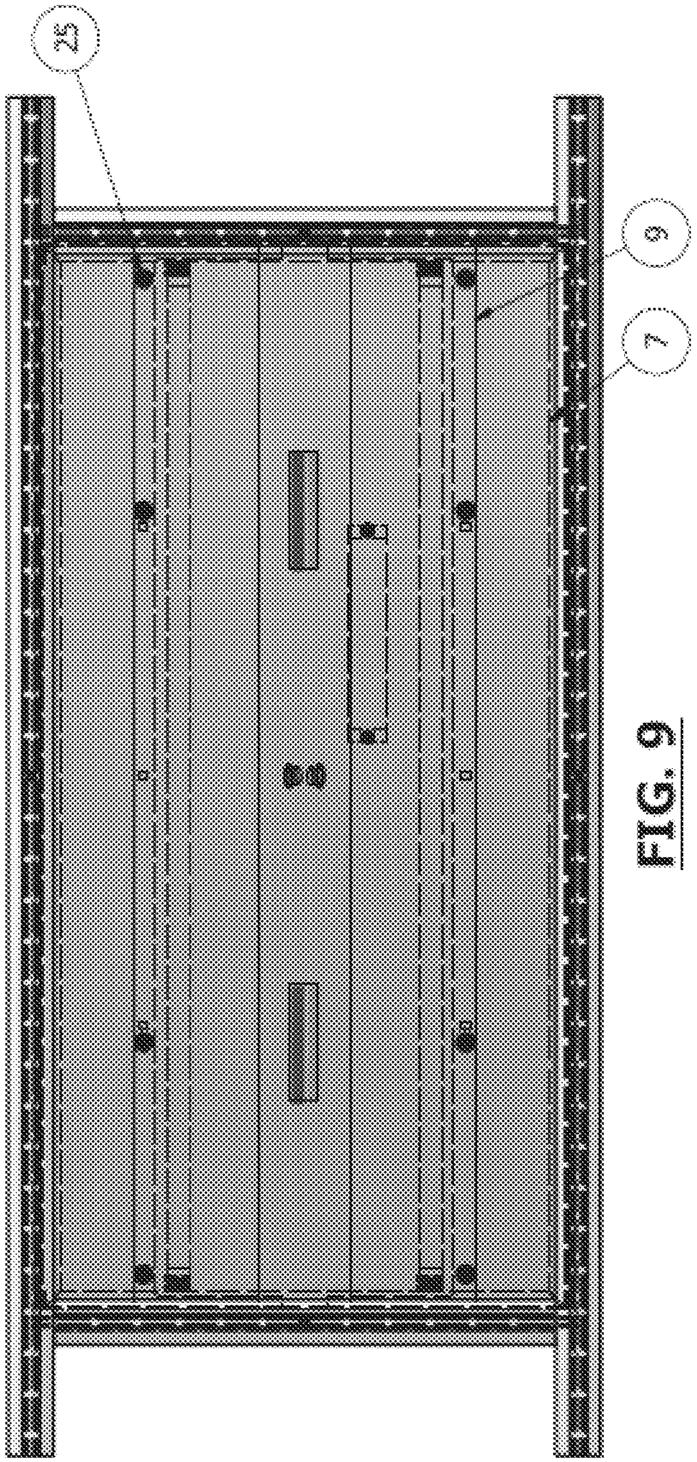
FIG. 9 depicts a perspective view from the top of a light system of FIG. 8 within tracks useable for a ceiling grid in accordance with an aspect of the present invention.

Referring now to FIGS. 8 and 9 the orientation of the light system 1 on tracks 3 usable in the grid system 4 will be described. The grid system 4 is formed from tracks 3 which support the light system 1 once the light transmissible lens 5 is located on the upper surfaces of the tracks 3 and is sealed to the tracks to prevent air and air borne particles and pathogens from passing into the light fixture 7 and/or into the light system 1 from the clean room 2. The light sources 11 in this aspect are LED lights affixed to the underside of the light assembly 9 using clips 33 which hold the LED lights 11. The LEDs of the light sources point in the downward direction, which may eliminate the need for a reflector between the light source and the light assembly 9 as may be required for non LED light sources, tubes or bulbs. The driver 15 is fixed by fasteners such as screws to the underside of the light assembly 9 and is electrically connected to the LED lights using wiring which passes through the grommets 26 of the passage 27. Referring now to FIG. 9, the top side of and assembled light assembly 1 within tracks 3 is shown. The light assembly 9 is affixed to the top surface of the light fixture 7. Screws 25 are used as fasteners to removably fix the light assembly 9 to the light fixture 7. These types of fasteners assist allowing the light fixture 7 to be maintained or serviced from the area above the clean room 2 instead of from the clean room 2. As such, the hermetic seal of the ceiling grid system 4 within the ceiling of a clean room 2 need not be disturbed to service the light fixture 7. Instead, the area above the ceiling may be accessed by maintenance personnel to service, maintain or replace the light assembly 9 or light fixture 7.

The light system 1 may be installed in the following manner. After the tracks 3 are suspended to form the ceiling grid system 4, openings for which the light fixture 7 will be inserted are identified. For each opening where a light fixture 7 will be inserted, each light system 1 may be installed as follows. First, a seal or sealant 21 may be placed on the upper surfaces of the tracks 3 about the entire periphery of the lip forming the rectangular opening. Then, the lens 5 is placed above the lip so as to cover the entire opening of the grid system 4 between the tracks 3. In this manner a hermetic seal 21 is formed by the tracks 3 and lens 5. Then, the light fixture 7 is placed above the lens 5 and the lip of the tracks 3; the light fixture 7 contacts the upper surface of the lens 5 while the lower surface of the lens 5 rests in the lip of the tracks 3. A seal or sealant may also be put on the upper surface of the lens 5 prior to installing the light fixture 7 to form a seal 23 between the upper surface of the lens 5 and the light fixture 7. Once these are all in place, a plurality of clamps such as those shown in FIG. 5C are arranged as required to secure the fixture within that grid opening and adjusted to compress the seal sufficiently to specification.

Alternatively, the light system 1 may be installed when the lens 5 is pre-sealed to the light fixture 7. In this aspect, the lens 5 is hermetically sealed to the light fixture 7 prior to assembly into the grid system 4. So, the lens 5 and light fixture 7 are installed in one piece. The hermetic seal 21 between the lens 5 and light fixture 7 may be achieved by use of an adhesive sealant or any other seal or sealing technique, such as one or more clamps. A sealant or seal may be applied to the upper surface of the tracks 3 and the light fixture 7 (with the lens 5 thereon) inserted into the opening onto the seal or sealant 21 on the lip of the tracks.

In some embodiments, and as shown in FIG. 10, clamps 29 may be used in the grid system to hold the light system together and to provide a force onto the light fixture 7 and lens 5, and to provide a force to the seals between the lens and track and lens and light fixture 7. Referring to FIG. 10, in one embodiment of a light system in accordance with the invention, the clamps 29 may form part of the tracks 3. In such embodiment, the clamps include a head 31 which has a lip on its underside which contacts the edge of the light fixture 7. The head 31 is connected to a body of the clamp which moves vertically relative to the rest of the track 3. A threaded member or bolt 33 may extend vertically through the clamp (e.g., its head and/or body) and into the track 3. The threaded bolt 33 may engage threads in the clamp to depress the clamp and apply a force to the light fixture when the treaded bolt is rotated about its central axis. However, other forms and embodiments of clamps may be used to hold the light system together and to provide a force onto the light fixture 7 and lens 5, and to provide a force to the seals between the lens and track and lens and light fixture 7. And, the invention herein is not limited to any clamp. As previously described herein the hermetic seal between the lens and tracks may be achieved by use of a separate sealant, adhesive sealant or seal, non-adhesive sealant or seal such as a foam, plastic or rubber or similar materials. Further the seals may be compressed to specifications and the fixture secured with clamps of which the type shown in FIG. 10 is an example but not the only option.

The tracks 3 which form the ceiling grid structures are supported or suspended from the building structure and thus are sufficiently strong enough to withhold the weight of maintenance personnel walking on the top of the grid system 4. Thus, to service the light system 1, a maintenance person may simply access the area above the clean room 2 and walk on the surfaces of the grid system 4 adjacent a light fixture light system 1 and remove light assembly 9 from the light fixture 7 by unscrewing or unfastening the same. The light fixture 7 may now be serviced or maintained by replacing or changing the entire light assembly 9 including all of the components which are attached to the light assembly 9, such as the light sources 11 and driver 15. A new or refurbished light assembly 9 may then be fastened to the top of the light fixture 7. Or, instead of replacing the entire light assembly 9, the light fixture 7 may be serviced by separately changing and/or removing different components of the light assembly 9 including the light sources 11, driver 15, wiring and any other electronic devices or components. Then the light assembly, with its new components, may be refastened to the top of the light fixture 7. Accordingly, the light fixture 7 can be serviced without disturbing the hermetic seal 21 between the lens 5 and tracks 3, or the hermetic seal 23 between the lens 5 and light fixture 7.

The invention claimed is:

1. A clean room lighting system for use in a ceiling grid system having a plurality of intersecting tracks for supporting panels, the ceiling grid system having an upward facing side and a downward facing side, wherein the downward facing side forms a ceiling of a clean room and the upward facing side faces an above area isolated from the clean room, wherein the ceiling grid system hermetically seals the clean room from the above area, the system comprising:

a light transmissible lens hermetically sealed to one or more tracks of the ceiling grid system on the first upward side of a portion of the tracks so as to inhibit particles from passing between tracks and the lens;

a light fixture located above the first upward side of a portion of the tracks and on a first upward surface of the lens; and the light fixture comprising a light assembly, the light assembly being removably coupled to the upward side of the light fixture to allow the light assembly to be removed from the light fixture by raising the light assembly from the light fixture;

wherein the lens and tracks and seal therebetween form a hermetic seal to hermetically isolate light fixture from the clean room.

2. The lighting system of claim 1 wherein the light assembly comprises one or more light sources and electronic components to be coupled to the light sources.

3. The lighting system of claim 2 wherein the light assembly comprises LED light sources.

4. The lighting system of claim 3 wherein the light assembly comprises a driver.

5. The lighting system of claim 4 wherein the light assembly, light sources, electronic components and driver are removeable from the light fixture in one piece.

6. The lighting system of claim 1 wherein light fixture is hermetically sealed to a first upward surface of the lens so as to inhibit air and airborne particles from passing between the lens and the light fixture.

7. The lighting system of claim 2 further comprising a clamp to clamp the light fixture to the lens.

8. The lighting system of claim 2 comprising a sealant between the lens and the one or more tracks to hermetically seal the lens to the one or more tracks.

9. The lighting system of claim 2 comprising a sealant between the first upward surface of the lens and the light fixture.

10. A clean room lighting system comprising:

a light transmissible lens hermetically sealable to one or more intersecting tracks of a ceiling grid system on the first upward side of a portion of the tracks so as to inhibit air and air borne particles from passing between tracks and the lens;

a light fixture configured to fit on the first upward surface of the tracks and above the a first upward surface of the lens; and the light fixture comprising a light assembly, the light assembly being removably coupled to the upward side of the light fixture to allow the light assembly to be removed from the light fixture by raising the light assembly from the light fixture; and at least one seal or sealant for sealing the light transmittable lens to the first upward side of a portion of the one or more intersecting tracks wherein upon hermetically sealing the light transmissible lens to the first upward side of the tracks and placing the light fixture to the first upward surface of the lens, the downward facing side of the ceiling system forms a ceiling of a clean room and the upward facing side faces an above area isolated from the clean room, and the ceiling grid system hermetically seals the clean room from the above area.

11. The lighting system of claim 10 wherein the light assembly comprises one or more light sources and electronic components to be coupled to the light sources.

12. The lighting system of claim 11 wherein the light assembly comprises LED light sources.

13. The lighting system of claim 12 wherein the light assembly comprises a driver.

14. The lighting system of claim 13 wherein the light assembly, light sources, electronic components and driver are removeable from the light fixture in one piece.

15. The lighting system of claim 10 wherein light fixture is hermetically sealed to a first upward surface of the lens so as to inhibit air and air borne particles from passing between the lens and the light fixture.

16. The lighting system of claim 10 further comprising a clamp to clamp the light fixture to the lens and compress the seal.

17. The lighting system of claim 10 wherein the at least one seal or sealant comprises an adhesive sealant.

18. A method of facilitating a clean room lighting system comprising:

hermetically sealing a light transmissible lens to one or more intersecting tracks of a ceiling grid system on the first upward side of a portion of the tracks so as to inhibit air and air borne particles from passing between tracks and the lens;

fitting a light fixture on the first upward surface of the tracks and above the a first upward surface of the lens, wherein the light fixture comprises a light assembly, the light assembly being removably coupled to the upward side of the light fixture to allow the light assembly to be removed from the light fixture by raising the light assembly from the light fixture wherein upon hermetically sealing the light transmissible lens to the first upward side of the tracks and placing the light fixture on the first upward surface of the lens, the downward facing side of the ceiling system forms a ceiling of a clean room and the upward facing side faces an above area isolated from the clean room, and the ceiling grid system hermetically seals the clean room from the above area.

19. The method of claim 18 further comprising hermetically sealing the light fixture to the first upward surface of the lens.

20. The method of claim 19 further comprising servicing the light system via the above area isolated from the clean room by accessing the light fixture and/or light assembly without disturbing a hermetic seal between the light transmissible lens and the first upward side of a portion of the one or more intersecting tracks and/or without disturbing a hermetic seal between the first upward surface of the lens and the light fixture.

* * * * *